US 8,055,729 B2

(12) United States Patent
Warasawa

(10) Patent No.: US 8,055,729 B2
(45) Date of Patent: Nov. 8, 2011

(54) SYSTEM, METHOD AND PROGRAM PRODUCT FOR AUTHENTICATING AN E-MAIL AND/OR ATTACHMENT

(75) Inventor: Fumiki Warasawa, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 2203 days.

(21) Appl. No.: 10/851,731

(22) Filed: May 21, 2004

(65) Prior Publication Data

US 2005/0015457 A1     Jan. 20, 2005

(30) Foreign Application Priority Data

May 23, 2003   (JP) ................................ 2003-145990

(51) Int. Cl.
*G06F 15/16* (2006.01)
(52) U.S. Cl. ...................................................... 709/219
(58) Field of Classification Search .................. 709/217, 709/219, 225
See application file for complete search history.

(56) References Cited

U.S. PATENT DOCUMENTS

| 6,356,935 | B1 * | 3/2002 | Gibbs ........................... 709/206 |
| 6,438,251 | B1 * | 8/2002 | Yamaguchi ................... 382/100 |
| 6,584,564 | B2 * | 6/2003 | Olkin et al. ..................... 713/152 |
| 6,745,327 | B1 * | 6/2004 | Messing ........................ 713/170 |
| 6,820,202 | B1 * | 11/2004 | Wheeler et al. ............... 713/185 |
| 6,983,309 | B1 * | 1/2006 | Yoshizawa ..................... 709/206 |

(Continued)

FOREIGN PATENT DOCUMENTS

EP     1058199 A2   6/2000

(Continued)

OTHER PUBLICATIONS

"Summary of JP Examiner Cited Art", (Jan. 29, 2007).

(Continued)

*Primary Examiner* — Jeffrey Pwu
*Assistant Examiner* — Scott M Sciacca
(74) *Attorney, Agent, or Firm* — Yee & Associates, P.C.; Arthur J. Samodovitz

(57) ABSTRACT

A system, method and program product for authenticating an e-mail. A user requests to register a visual signature image with a sending mail server, and in response, the sending mail server furnishes a first identifier to the user. Subsequently, the user requests the sending mail server to send an e-mail with the visual signature image and supplies the e-mail and first identifier to the sending mail server. In response, the sending mail server validates the first identifier, and sends the e-mail with a second identifier to a receiving mail server. In response, the receiving mail server validates the second identifier. The second identifier identifies an addressee of the e-mail, and the receiving mail server validates the second identifier by comparing the addressee identified by the acceptance identifier to an addressee within the e-mail. The sending mail server embeds the second identifier in the visual signature image and sends the visual signature image with the embedded second identifier to the receiving mail server. The invention also resides in the image representing an originator of an e-mail and/or an attachment to the e-mail; the image is included in the e-mail, an icon for the attachment or the attachment. The image includes an identity of an originator and an identity of a recipient intended by the originator. The e-mail with the added image is sent to the intended recipient. The image and identities of the originator and recipient authenticate the e-mail and/or the attachment.

31 Claims, 13 Drawing Sheets

U.S. PATENT DOCUMENTS

| | | | |
|---|---|---|---|
| 2001/0034835 A1* | 10/2001 | Smith | 713/175 |
| 2002/0007453 A1* | 1/2002 | Nemovicher | 713/155 |
| 2002/0116508 A1* | 8/2002 | Khan et al. | 709/229 |
| 2004/0078337 A1* | 4/2004 | King et al. | 705/51 |
| 2004/0181571 A1* | 9/2004 | Atkinson et al. | 709/200 |
| 2004/0181581 A1* | 9/2004 | Kosco | 709/206 |
| 2004/0249817 A1* | 12/2004 | Liu et al. | 707/9 |
| 2005/0055451 A1* | 3/2005 | Tsuyama et al. | 709/229 |
| 2006/0149970 A1* | 7/2006 | Imazu | 713/183 |
| 2008/0082618 A1* | 4/2008 | Jones | 709/206 |

FOREIGN PATENT DOCUMENTS

| | | |
|---|---|---|
| EP | 1096723 A2 | 2/2001 |
| JP | 06-175904 | 6/1994 |
| JP | 11-212849 | 8/1999 |
| JP | 2001-125846 | 5/2001 |
| JP | 2001-216221 | 8/2001 |
| JP | 2002-063143 | 2/2002 |
| JP | 2002-157525 | 5/2002 |
| JP | 2003-006125 | 1/2003 |
| JP | 2003-150928 | 5/2003 |

OTHER PUBLICATIONS

"Audio Datahiding Has Been Certified by Step" http://www.research.ibm.com, (May 21, 2004).

* cited by examiner

FIG. 4

| FIELD NAME | | KEY | CONTENTS |
|---|---|---|---|
| SIGNATURE IDENTIFIER | | O | LOCATION INFORMATION OF IMAGE FILE |
| IDENTIFIER OF REGISTERED SIGNATURE | | x | INFORMATION IDENTIFYING LOCATION OF FILE OF SIGNATURE IMAGE (DIRECTORY NAME, FILE NAME, ETC.) |
| PASSWORD | | x | PASSWORD TO BE SPECIFIED WHEN CALLING SIGNATURE |
| LOG RECORD 1 TO n | | x | USE HISTORY INFORMATION OF THIS SIGNATURE |
| | KIND OF EVENT | | KIND OF EVENT WHICH HAS OCCURRED (REGISTRATION, CHANGE, REQUEST OF ATTACHMENT TO MAIL, SENDING OF SIGNATURE IMAGE, ETC.) |
| | TIME STAMP | x | DATE AND TIME WHEN EVENT OCCURS |
| | EVENT DEPENDENT INFORMATION | | INFORMATION DEPENDENT ON EVENT |

FIG. 5

| FIELD NAME | KEY | CONTENTS |
|---|---|---|
| ACCEPTANCE IDENTIFIER | O | ISSUED ACCEPTANCE IDENTIFIER |
| SIGNATURE IDENTIFIER | x | SIGNATURE IDENTIFIER OF SIGNATURE ASSOCIATED WITH THIS ACCEPTANCE IDENTIFIER |
| EXPIRATION DATE AND TIME | x | EXPIRATION DATA AND TIME UNTIL WHICH RECEIVER CAN REQUEST SIGNATURE WITH THIS ACCEPTANCE IDENTIFIER |
| DESTINATION IDENTIFIER | x | DESTINATION OF SIGNATURE REQUESTED WITH THIS ACCEPTANCE IDENTIFIER |

FIG. 6

| FIELD NAME | KEY | CONTENTS |
|---|---|---|
| ACCEPTANCE IDENTIFIER | O | RECEIVED ACCEPTANCE IDENTIFIER |
| DATE AND TIME OF RECEIVING MAIL | x | DATE AND TIME OF RECEIVING MAIL WITH THIS ACCEPTANCE IDENTIFIER ATTACHED THERETO |
| DATE AND TIME OF REQUESTING SENDING OF SIGNATURE | x | DATE AND TIME OF REQUESTING SENDING OF SIGNATURE IMAGE FROM SENDING SOURCE WITH THIS ACCEPTANCE IDENTIFIER (BLANK: UNREQUESTED) |
| DATE AND TIME OF RECEIVING SIGNATURE | x | DATE AND TIME OF RECEIVING REQUESTED SIGNATURE IMAGE (BLANK: UNRECEIVED) |
| LOCATION INFORMATION OF IMAGE FILE | x | INFORMATION IDENTIFYING LOCATION OF FILE OF SIGNATURE IMAGE (DIRECTORY NAME, FILE NAME, ETC.) |

FIG. 7

| FIELD NAME | KEY | CONTENTS |
|---|---|---|
| DATE AND TIME OF EVENT OCCURRENCE | x | DATE AND TIME WHEN EVENT RECORDED IN THIS RECORD OCCURRED |
| EVENT | x | KIND OF EVENT (EVENTS ON SENDING SIDE INCLUDE: REGISTRATION WITH SENDING SIGNATURE DB, CHANGE, DELETION, REQUEST OF ATTACHMENT TO MAIL, AND SENDING OF SIGNATURE IMAGE; DELETION OF ACCEPTANCE IDENTIFIER DB RECORD AFTER SENDING. EVENTS ON RECEIVING SIDE INCLUDE: RECEIVING OF MAIL WITH ACCEPTANCE IDENTIFIER; REQUEST OF SENDING AND RECEIVING OF SIGNATURE IMAGE; DELETION FROM RECEIVING SIGNATURE DB AFTER DELETION OF MAIL; ETC.) |
| EVENT IDENTIFIER | x | IDENTIFIER FOR IDENTIFYING EVENT (SIGNATURE IDENTIFIER WHEN EVENT IS REGISTRATION TO SENDING SIGNATURE DB; AND ACCEPTANCE IDENTIFIER WHEN EVENT IS REQUEST OF ATTACHMENT TO MAIL) |
| EVENT DEPENDENT INFORMATION | x | INFORMATION DEPENDENT ON EACH EVENT OTHER THAN EVENT IDENTIFIER |

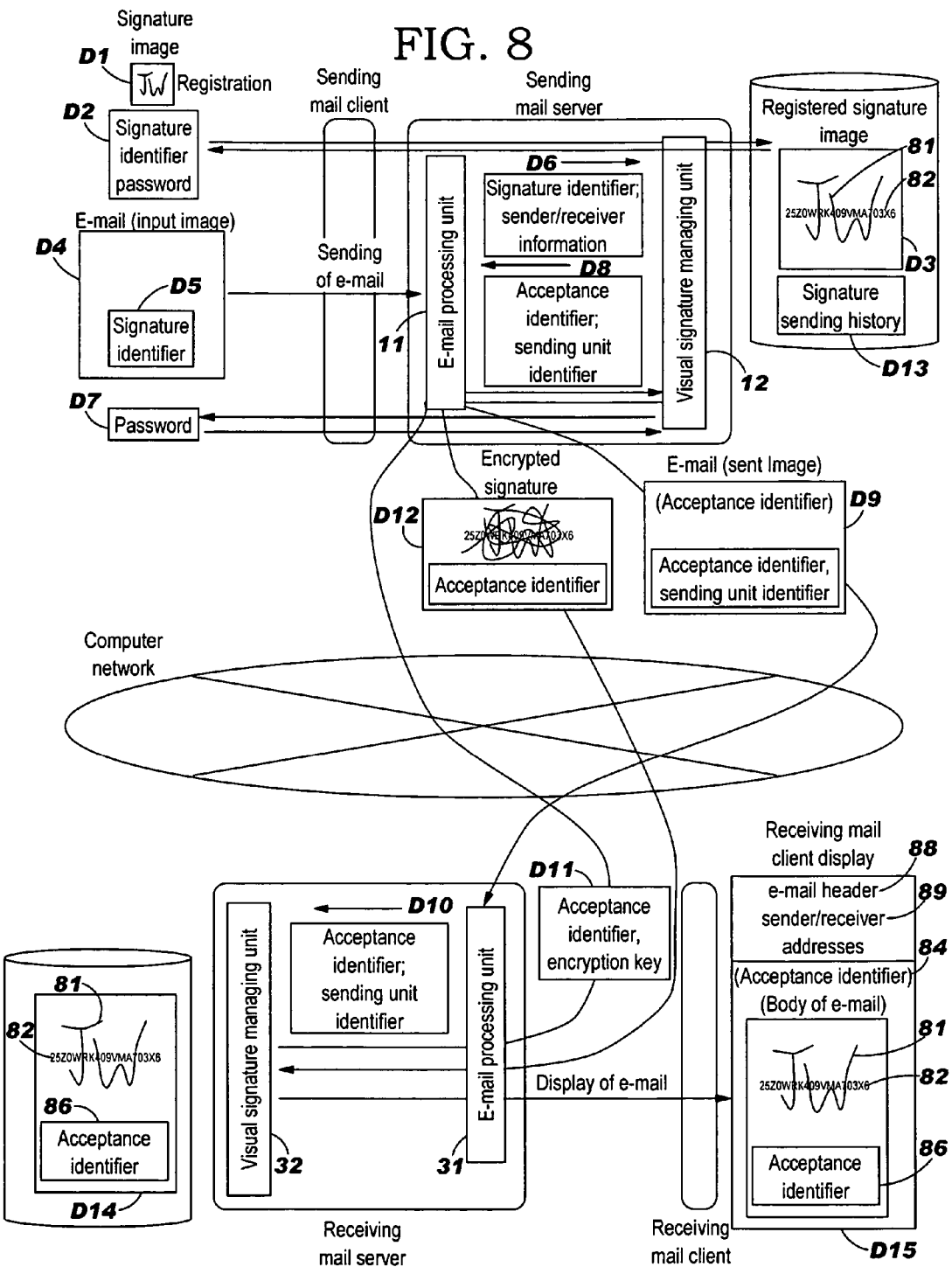

SYSTEM, METHOD AND PROGRAM PRODUCT FOR AUTHENTICATING AN E-MAIL AND/OR ATTACHMENT

BACKGROUND OF THE INVENTION

The invention relates generally to computer systems, and deals more particularly with a system, method and program product for authenticating an e-mail and/or an attachment to the e-mail.

Electronic mail or "e-mail" is common today. One problem with e-mail is proving to the recipient that the sender of an e-mail (with or without an attachment) is the person indicated as the sender. It was known to superimpose an image of a human signature or facial portrait to an e-mail to prove that the sender of the e-mail is the author of the e-mail. The signature image is thereby sent with the e-mail to the intended recipient. See for example, Japanese Published Unexamined Patent Application #2001-125846. One problem with this technique is that a forger who has access to the signature image can copy the signature image onto another e-mail authored by the forger. Also, nothing prevents the recipient of the e-mail from detaching an attachment (for example, a data file) to the e-mail, attaching it to another e-mail, and transferring the attachment as his or her own work to others with this other e-mail. In such a case, the recipient of this other e-mail with the attachment cannot be sure that the sender of this other e-mail authored the attachment.

Accordingly, an object of the present invention is to discourage forgery of e-mails.

Another object of the present invention is to authenticate the author of an e-mail.

Another object of the present invention is to authenticate the author of an attachment to an e-mail.

Another object of the present invention is to enable tracing of an original sender and original receiver of an e-mail and/or an attachment to the e-mail.

SUMMARY OF THE INVENTION

The invention resides in a system, method and program product for authenticating an e-mail. A user requests to register a visual signature image with a sending mail server, and in response, the sending mail server furnishes a first identifier to the user. Subsequently, the user requests the sending mail server to send an e-mail with the visual signature image and supplies the e-mail and first identifier to the sending mail server. In response, the sending mail server validates the first identifier, and sends the e-mail with a second identifier to a receiving mail server. In response, the receiving mail server validates the second identifier and requests that the sending mail server send the visual signature with the second identifier embedded therein. The sending mail server embeds the second identifier in the visual signature image and sends the visual signature image with the embedded second identifier to the receiving mail server.

According to a feature of the present invention, the sending mail server embeds a third identifier in the image in response to the user requesting to register the image. When the sending mail server embeds the second identifier in the visual signature image, the sending mail server embeds the second identifier in the image embedded with the third identifier.

According to another feature of the present invention, the sending mail server validates the first identifier based on a password of the user.

According to another feature of the present invention, when the sending mail server sends the e-mail with the second identifier to the receiving mail server, the sending mail server includes an identifier of the sending mail server.

According to another feature of the present invention, after the receiving mail server validates the second identifier, the receiving mail server sends the second identifier and an encryption key to the sending mail server. When the sending mail server sends the visual signature image with the embedded second identifier to the receiving mail server, the visual signature image with the embedded second identifier is encrypted with the encryption key.

According to another feature of the present invention, the sending mail server embeds a third identifier in the image in response to the step of the user requesting to register the image. After the receiving mail server validates the first identifier, the receiving mail server sends the second identifier and an encryption key to the sending mail server. When the sending mail server sends the visual signature image with the embedded second identifier to the receiving mail server, the visual signature image is embedded with both the second and third identifiers and is encrypted with the encryption key.

According to another feature of the present invention, when an intended recipient of the e-mail server requests the e-mail from the receiving mail server, the receiving mail server furnishes the e-mail with the visual signature image with the second identifier embedded therein.

According to another feature of the present invention, the second identifier identifies an addressee of the e-mail, and the receiving mail server validates the second identifier by comparing the addressee identified by the acceptance identifier to an addressee within the e-mail.

The invention also resides in a system, method and program product for authenticating an e-mail and/or an attachment in the e-mail. An image representing an originator of an e-mail and/or an attachment to the e-mail is included in the e-mail, an icon for the attachment or the attachment. The image includes an identity of an originator and an identity of a recipient intended by the originator. Then, the e-mail with the added image is sent to the intended recipient. The image and identities of the originator and recipient authenticate the e-mail and/or the attachment.

According to features of the present invention, the identity of the originator is an e-mail address of the originator, and the identity of the intended recipient is an e-mail address of the intended recipient. Also included in the image, is an approximate date or time that the originator initiated sending of the e-mail and/or the attachment to the intended recipient. The identities can be included in the image such that they will or will not be visibly displayed with the image. Also included in the image is an identifier generated by a mail server for the originator of said e-mail and/or attachment. The identifier is unique for each e-mail sent to the mail server. Also, the identity of the originator and the identity of the intended recipient can be added to the e-mail apart from the image.

BRIEF DESCRIPTION OF THE FIGURES

FIG. 4 is an example of a record for a visual signature in a sending signature database 14 within the sending mail server of FIG. 2.

FIG. 5 is an example of a record for an acceptance identifier within the sending mail server of FIG. 2.

FIG. 6 is an example of a visual signature record in the receiving mail server of FIG. 3.

FIG. 7 is an example of a log record within receiving mail server of FIG. 3.

FIG. 8 is a flow diagram illustrating registration of a visual signature image within the e-mail system of FIG. 1.

DETAILED DESCRIPTION OF THE PREFERRED EMBODIMENTS

Figure 1:
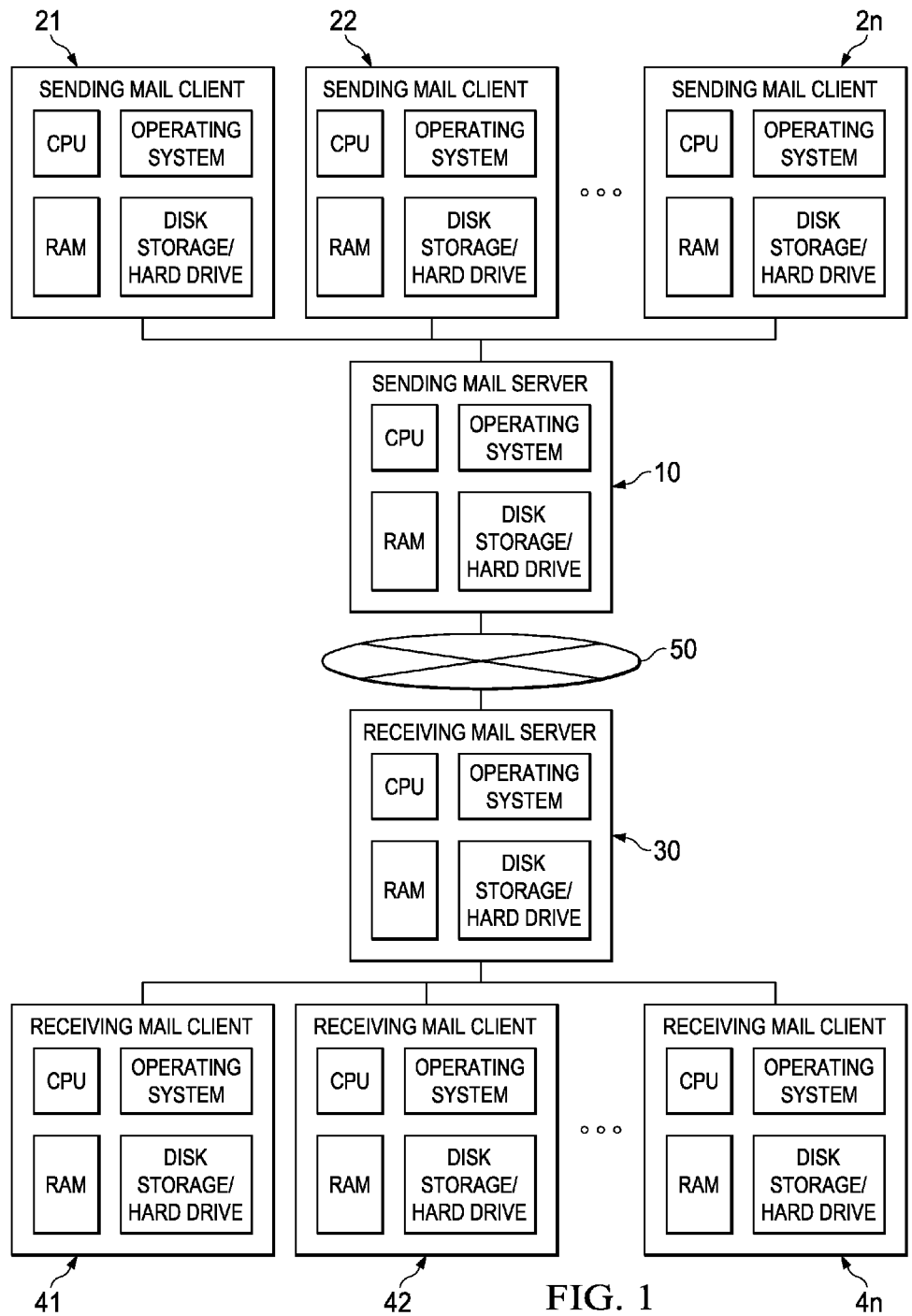
FIG. 1 is a block diagram of an e-mail system which includes the present invention.

The present invention will now be described in detail with reference to the figures. FIG. 1 illustrates an e-mail system generally designated 10 which incorporates the present invention. E-mail system 10 comprises sending mail client computers 21, 22 . . . 2n, coupled via a network to a sending mail server computer 10. Each of the sending mail client computers comprises a CPU, a main memory, an external storage, a communication control unit, an operating system and an e-mail application program. System 10 also comprises receiving mail client computers 41, 42 . . . 4n coupled via a network to a receiving mail server computer 30. Server computers 10 and 30 are coupled to each other via a network 50, such as the Internet. The sending mail server 10 includes a CPU, computer-readable main memory, computer-readable disk storage, a communication control unit, an operating system and an application—which is stored on its computer-readable disk storage for execution by its CPU via its computer-readable memory—to send e-mail from a sending mail client computer to the mail receiving server computer 30. The receiving mail server 30 includes a CPU, main memory, storage, a communication control unit, an operating system and an application to receive e-mail from the sending mail server computer and forward it to a receiving mail client computer. (The sending mail server 10 also can include a mail receiving application function, and likewise, receiving mail server 30 also includes a mail sending application function, so system 10 is bi-directional.)

Figure 2:
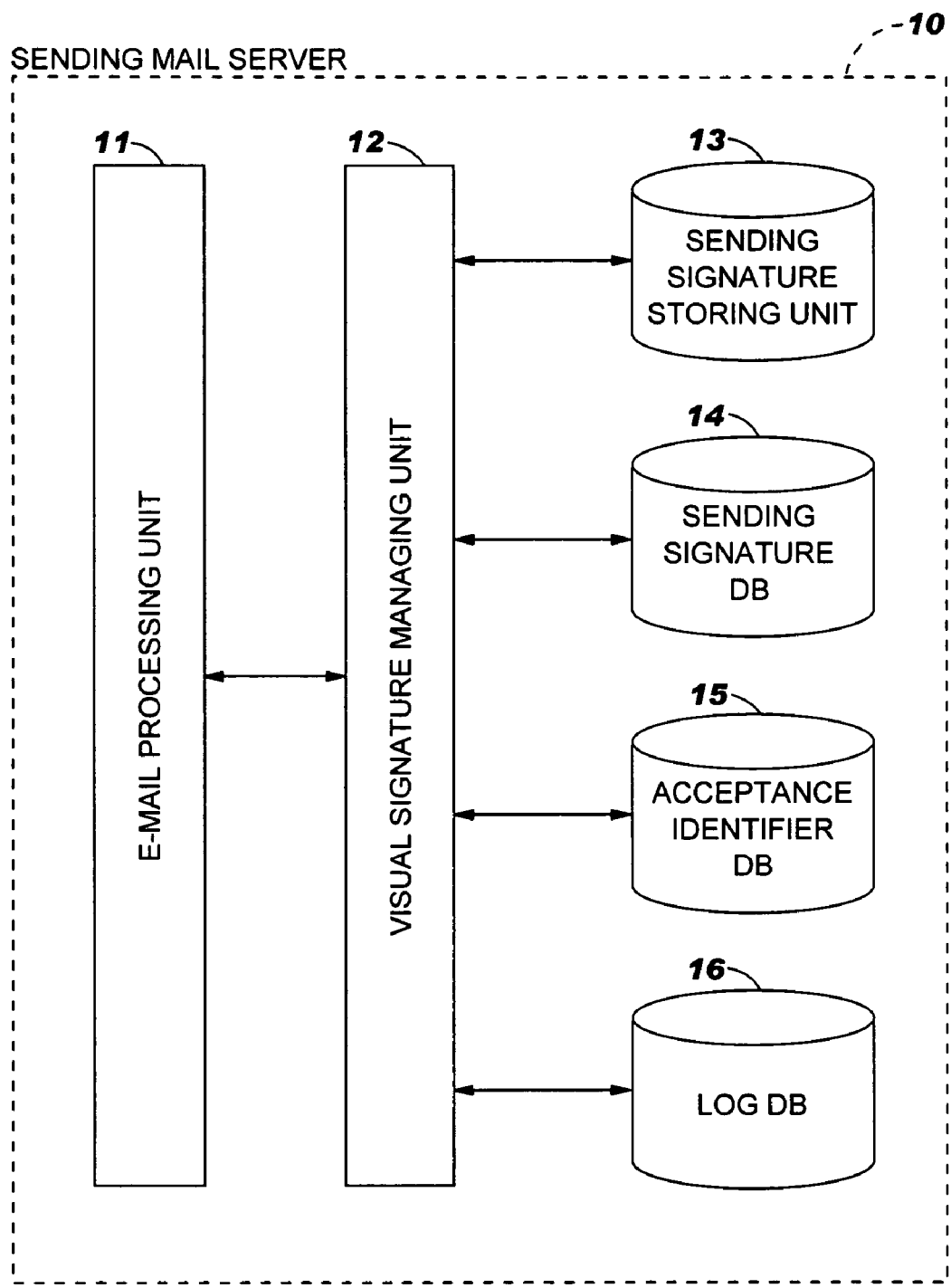
FIG. 2 is a block diagram of a sending mail server within the e-mail system of FIG. 1.

FIG. 2 illustrates the sending mail server 10 in more detail. Sending mail server 10 comprises an e-mail processing unit 11 (which includes a program function), a visual signature managing unit 12 (which includes a program function), a sending signature storing unit 13 (which includes a program function), a sending signature data base ("signature DB") 14, an acceptance identifier database ("acceptance identifier DB") 15 and a log database ("log DB") 16. The e-mail processing unit 11 performs the function of sending an e-mail with or without a signature identifier. The signature image is associated with the e-mail, and not included within the e-mail. When the mail has such an associated signature image, the e-mail processing unit 11 embeds an acceptance identifier number somewhere in the e-mail such as in the e-mail header. The acceptance identifier number was generated and furnished by the visual signature managing unit 12. The visual signature managing unit 12 also performs the functions of registering, changing and deleting a visual signature. The visual signature managing function 12 also sends, in response to a request to send an e-mail with a signature image accompanied by an acceptance identifier, the e-mail with the signature image and acceptance identifier to the receiving mail server 30. Sending signature DB 14 maintains information (in the form of records) about a human signature registered by a holder/owner of the signature. The sending signature DB 14 contains multiple records, one such record corresponds to each human signature. Visual signature managing unit 12 generates each record when a human signature is registered by the owner/holder, and deletes the record when the owner/holder of the signature deletes the human signature. Sending signature DB 14 does not store the human signature itself. Instead, the sending signature storing unit 13 stores the human signature. The acceptance identifier DB 15 contains acceptance identifiers furnished by the visual signature managing unit 12. The log DB 16 in the sending mail server 10 records events such as creation, change and deletion of a signature image file.

Figure 3:
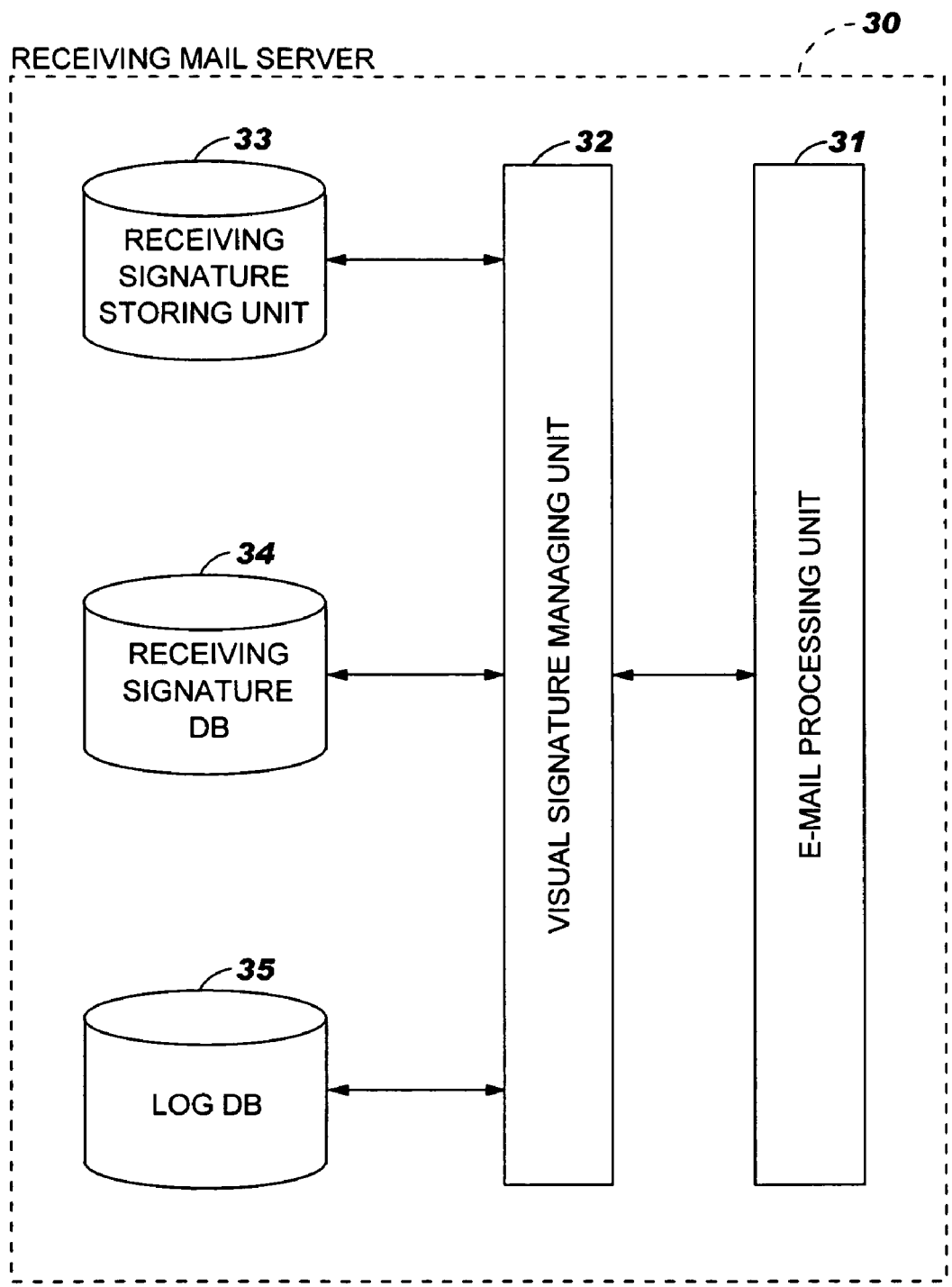
FIG. 3 is a block diagram of a receiving mail server within the e-mail system of FIG. 1.

FIG. 3 illustrates the receiving mail server 30 in more detail. Receiving mail server 30 comprises an e-mail processing unit 31 (which includes a program function), a visual signature managing unit 32 (which includes a program function), a receiving signature storing unit 33 (which includes a program function), a receiving signature database ("receiving signature DB") 34 and a log database ("log DB") 35. The e-mail processing unit 31 performs the functions of storing an e-mail with or without a signature identifier, received from the sending mail server 10. When the e-mail includes an acceptance identifier, the e-mail processing unit 31 causes the visual signature managing unit 32 to send a request to the sending mail server 10 to send a signature image and acceptance identifier corresponding to the signature identifier. The visual signature managing function 32 also performs the function of displaying and deleting an e-mail with a visual signature.

In the embodiment illustrated in FIGS. 2 and 3, the sending mail server 10 and the receiving mail server each have their own separate visual signature managing unit 12 and 32 respectively. However, if desired, there can be only one visual signature managing function for both servers. In such a case, the one visual signature managing function would execute on a server accessible to both the e-mail processing unit 11 of servers 10 and the e-mail processing unit 32 of server 30. Also, in such a case, server 10 would retain its own e-mail sending function (which was part of visual signature managing unit 12). Likewise, in such a case, server 30 would retain its own e-mail receiving function (which was part of visual signature managing unit 32).

The foregoing databases will now be described in detail with reference to FIGS. 4-7. In these figures, a field with a circle symbol ("O") in the "key" column is a "key" field, and enables a computer program to directly access a particular record by specifying the value of the field shown therein. (Other known databases, such as those to store e-mails, will not be described in detail because they are well known.)

FIG. 4 illustrates an example of a record for a visual signature in the sending signature DB 14. Each record includes a signature identifier called "Identifier of Registered Signature" (for example, in the form of location information of an image field of the human signature), a password and log records. Each log record includes fields for storing the type of event such as registration, change, request of inclusion of signature image to an e-mail and sending of signature image, a time stamp and event-dependent information.

FIG. 5 illustrates an example of a record for an acceptance identifier within the acceptance identifier DB 15 within the sending mail server 10. In the example illustrated in FIG. 5, each record includes an acceptance identifier, a signature identifier, an expiration date and time, and a destination identifier. There is one such record for each acceptance identifier. Each acceptance identifier is issued by the visual signature managing unit 12 when a signature holder requests a signature image to be sent with an e-mail. The visual signature managing unit 12 within the sending mail server 10 can access the acceptance identifier DB 15 using the acceptance identifier as a key. When the receiving mail server 30 supplies an acceptance identifier and requests that a signature image be sent, the visual signature managing unit 12 accesses the acceptance identifier record using the acceptance identifier as a key to obtain the corresponding signature identifier. Then, the visual signature managing unit 12 accesses the sending signature DB 14 using the signature identifier as a key to locate the desired visual signature image. Visual signature managing unit 12 can delete each acceptance identifier record when a signature image is sent to a recipient/destination.

FIG. 6 illustrates an example of a visual signature record in the receiving signature DB 34. This record contains information about a visual signature image received from the sending mail server 10 (but does not contain the visual signature image itself). The receiving signature storing unit 33 stores the actual visual signature image. The receiving signature DB 34 contains one record for each visual signature. Visual signature managing unit 32 creates each record when an e-mail with an acceptance identifier is received. Visual signature managing unit 32 deletes each record when the e-mail with the acceptance identifier is deleted. In this example, each record includes fields for an acceptance identifier, an e-mail receiving date and time, a signature-sending requesting data and time, a signature receiving date and time, and location information of the visual signature image.

FIG. 7 illustrates an example of a log record within log DB 16 within the sending mail server. The log DB 16 includes a record for each event, such as a date and time of the event, the event type, an event identifier and event-dependent information. In one embodiment of the log DB 16, the log DB 16 has been formatted to contain a predetermined number of records, and the records are sequentially used as each event occurs. When the log DB 16 fills-up, the next event is written in the first location, over-writing the first event to begin the cycle again.

FIG. 7 also illustrates an example of a log record within log DB 35 within the receiving mail server. The log DB 35 records events generated in connection with sending of a signature image such as a date and time of the event, the event type, an event identifier and event-dependent information. In one embodiment of the log DB 35, the log DB 35 has been formatted to contain a predetermined number of records, and the records are sequentially used as each event occurs. When the log DB 35 fills-up, the next event is written in the first location, over-writing the first event to begin the cycle again.

FIG. 8 is a flow diagram illustrating registration of the visual signature image within sending mail server 10 and subsequent processing and use/display of the visual signature image according to the present invention. A person who desires to include a visual signature image superimposed on an e-mail registers in advance with the visual signature managing unit 12 of the sending mail server 10. To register, the person supplies his or her personal visual signature image file "D1" (which is also indicated by reference number 81). The visual signature may be an image of the person's handwritten signature. However, the visual signature can be any other image as well, such as a picture of the person or anything else. In response, the visual signature managing unit 12 issues a signature identifier and a password "D2" to the person, and stores them for future reference in a sending signature DB 14 (not shown in FIG. 8). The person can subsequently reference, change or delete registration of his or her signature image via the visual signature managing unit 12 by furnishing the signature identifier and password. The person can also reference and edit or delete registration of a signature sending history, i.e. the associated log records in DB 14.) by specifying the signature identifier and the password D2. After registration of the visual signature image, the visual signature managing unit 12 assigns a multiple digit, random numeric value "D3" (which is also indicated by reference number 82) to the visual signature image and superimposes the numeric value D3/82 on the visual signature image to form a (single) compound visual signature image. This compound visual signature image will subsequently be displayed on an e-mail sent by the person, although an acceptance identifier generated later will also be superimposed on the compound visual signature along with the numeric value. If an impostor, who has access to the same visual signature image, registers the same visual signature image (using a different password), the visual signature managing unit 12 will create another compound visual signature image with a different numeric value superimposed on the visual signature image. Thus, the compound visual signature image of the true person will be different than that of the impostor. If an impostor, who has access to the real, (single) compound visual signature image, registers the real, (single) compound visual signature (using a different password), the visual signature managing unit 12 will create another, compound visual signature with two numeric values superimposed on the visual signature image, i.e. the numeric value of the real person and an additional numeric value of the impostor. Thus, the compound visual signature image of the true person will be different than the compound visual image of the impostor.

When the true person/real signature owner wants to add his or her compound visual signature to an e-mail "D4", the person includes the signature identifier "D5" in the e-mail and sends it to the sending mail server 10. In response, the e-mail processing unit 11 extracts the signature identifier and sender/receiver information "D6" from the e-mail, and sends the signature identifier and sender/receiver information to the visual signature managing unit 12. The sender/receiver information may be any information related to the sender and receiver such as their e-mail address (or addresses) obtained from the e-mail header. Next, the visual signature managing unit 12 requests that the person who sent the e-mail to input his or her password "D7". When the person/sender enters the password, the visual signature managing unit 12 compares the combination of signature identifier and password to those stored in the sending signature DB 14 to determine if there is a match. If so, the visual signature managing unit 12 concludes that the combination is valid, generates an acceptance identifier, and sends the acceptance identifier and a sending unit identifier "D8" to the e-mail processing unit 11. The acceptance identifier comprises sender/receiver identity information combined with the acceptance date and time information. The sender identity information preferably comprises the e-mail address of the person who registered the visual signature image and requested that the e-mail with the visual signature image be sent. The receiver identity information preferably comprises the e-mail address of the intended recipient as indicated in the header of the e-mail. Thus, the acceptance identifier indicates the identities of the sender and receiver and other conditions of the first transfer of the e-mail (and any attachment to the e-mail). The acceptance identifier is assigned to the request to send the e-mail with the compound visual signature that was previously registered with the visual signature managing unit 12. The sending unit identifier also identifies the visual signature managing unit 12, and may comprise a mail address or an IP address of the mail sending server 10 containing the visual signature managing unit 12. Then, the e-mail processing unit 11 adds the acceptance identifier and sending unit identifier to the message within the e-mail, i.e. to the body of the e-mail, and sends the e-mail with the acceptance identifier and sending unit identifier, collectively labeled "D9", to the receiving mail server 30. In the illustrated embodiment, this e-mail does not include the signature identifier which has been replaced with the acceptance identifier and the sending unit identifier.

The e-mail "D9" is received by the e-mail processing unit 31 of the receiving mail server 30. The e-mail processing unit 31 extracts the acceptance identifier and the sending unit identifier "D10" from the e-mail, and sends the acceptance identifier and the sending unit identifier "D10" to the visual signature managing unit 32. Previously, the visual signature managing unit 12 and the visual signature managing unit 32 agreed upon an encryption/decryption algorithm based on a public key system. The visual signature managing unit 32 sends the acceptance identifier and an encryption key "D11" to the visual signature managing unit 12 identified by the sending unit identifier identified by the e-mail processing unit 31 from the e-mail D9. Because the encryption method is based on a public key system, it is not necessary to encrypt the encryption key itself when it is sent. When receiving the acceptance identifier of the visual signature image, the visual signature managing unit 12 determines whether the request to send an e-mail with a signature image is valid. If expiration date and time information is included in the acceptance identifier, and the current date and time is after the expiration date and time, then the request is not valid. Furthermore, once an acceptance identifier is assigned to an e-mail, it cannot be used again for another e-mail. If the request to send an e-mail with a visual signature image is valid, the visual signature managing unit 12 combines the (single) compound visual signature image and the acceptance identifier into one (double) compound image which is difficult to separate. (The visual signature image is now "double" compound because both the numeric value generated earlier and the acceptance identifier are now superimposed on the visual signature image.) Also, the visual signature managing unit 12 encrypts a part of the (double) compound visual signature image with an encryption key and sends it to the visual signature managing unit 32 as an encrypted (double) compound visual signature image "D12". Various well-known methods can be employed to combine the (single) compound visual signature image and the acceptance identifier into one (double) compound image which is difficult to separate. For example, the acceptance identifier can be embedded with a very small font that it is not visible to a human eye (or the acceptance identifier can be visible to the human eye). Encryption of a part of the visual signature image can be realized by fragmenting the visual signature image, and sending a program for rebuilding the entire visual signature image from the fragments. The visual signature managing unit 12 also records a signature sending history "D13" which can be referenced by a signature holder. The signature sending history comprises signature identifier, identifier of registered signature, password, log record, kind of event, time stamp and event dependent information (as shown in FIG. 4).

After receiving the encrypted (double) compound visual signature image "D12" (including the acceptance identifier and the numeric value), the visual signature managing unit 32 decrypts the compound visual signature image "D12" and stores it as a decrypted compound visual signature image D14 separate from the e-mail. The decrypted compound visual signature image D14 includes the random number 82 and acceptance identifier 86 superimposed on the visual signature image. While the random number 82 is preferably superimposed over the actual visual signature, the acceptance identifier 86 is preferably superimposed adjacent to the visual signature to allow reading of the acceptance identifier 86 (if the acceptance identifier is visibly displayed as described below). Nevertheless, the visual signature 82, random number 82 and acceptance identifier 86 are all considered part of the same visual signature image. In the illustrated embodiment, the visual signature managing unit 32 acquires the compound visual signature image from the visual signature managing unit 12 via the e-mail processing unit 31 and the e-mail processing unit 11. However, alternately the visual signature managing unit 32 may acquire the compound visual signature image by directly exchanging information with the visual signature managing unit 12.

Next, a human operator of a receiving mail client activates his or her e-mail software to learn if an e-mail has been sent to him or her, and if so, requests that the e-mail be displayed at the receiving mail client. The display request is communicated from the receiving mail client to the receiving mail server 30. In response, the e-mail processing unit 31 of the receiving mail server 30 sends the e-mail to the receiving mail client. The e-mail software on the receiving mail client displays the e-mail "D15". The e-mail will include the (double) compound visual signature image D14 (which includes both the acceptance identifier 86 and the numeric value 82 superimposed on the visual signature). The acceptance identifier and numeric value superimposed on the visual signature image are provided for authentication and tracking of both the e-mail and visual signature image, as long as the visual signature image remains part of the e-mail. However, if the visual signature image is removed from the e-mail and incorporated into another e-mail, then the acceptance identifier and random number on the visual signature are used to track only the visual signature image. Preferably, the e-mail provided to the receiving mail client and furnished to the human operator will also include the acceptance identifier 84 (visible or invisible) embedded in the body of the e-mail apart from the visual signature image (and apart from other sender/receiver e-mail addresses 89 normally included in a header 88 of the e-mail). The acceptance identifier 84 embedded in the body of the e-mail (apart from the visual signature image) and sent by the receiving mail server 30 to the receiving mail client is the acceptance identifier generated by and added to the body of the e-mail by the e-mail processing unit 11 and sent by the sending mail server 10 to the receiving mail server 30 as D9, described above. Under normal circumstances, the acceptance identifier 84 added to the body of the e-mail (apart from the visual signature image) and the acceptance identifier 86 superimposed on the visual signature image are the same. The acceptance identifier added to the body of the e-mail is used to confirm that the visual signature is valid for the e-mail. In other words, if the acceptance identifier added to the body of the e-mail (apart form the visual signature image) matches the acceptance identifier superimposed on the visual signature image, then the sender of the e-mail is likely the person represented by the visual signature image. If they differ, then the e-mail may have been sent by someone other than the person represented by the visual signature image. Even though the acceptance identifier in the body of the e-mail (and superimposed on the visual signature image) generally contains the same sender/receiver addresses as in the standard header 88 for the e-mail, the acceptance identifier includes additional information such as the time and date stamp described above (or even a unique serial number). Consequently, the acceptance identifier is unique for each e-mail, even e-mails sent from the same sender to the same recipient. Consequently, the acceptance identifier uniquely identifies each e-mail, unlike the standard sender/receiver addresses 89 in the header 88 of the e-mail. This is useful for authentication purposes, and to ensure that the proper visual signature image is associated with the e-mail sent to the receiving mail client.

Preferably, it is required that the acceptance identifier included in the body of the e-mail (apart from the visual signature image) and the acceptance identifier included in the visual signature image match each other, before the e-mail will be provided to the receiving mail client and displayed with the compound visual signature image. Also, before the e-mail will be sent to the receiving mail client and displayed with the compound visual signature image, the e-mail processing unit 31 preferably requires that the receiver information in the acceptance identifier in the visual signature image or in the body of e-mail or both correspond to the receiving mail client.

Because the acceptance identifier indicates the originator of the e-mail and/or attachment, the recipient will know the true originator of the e-mail and/or attachment. If the standard address of the sender of the e-mail contained in the header for the e-mail differs from the originator's address contained in either acceptance identifier, this will reveal that the sender of the e-mail may not be authentic and may not have the right to send the e-mail and/or attachment. Similarly, if the actual-recipient's e-mail address differs from the intended-recipient's address contained in either acceptance identifier, this will reveal that the recipient was not intended and will raise doubts about the authenticity of the e-mail and/or attachment and the right of the recipient to receive and possess the e-mail and/or attachment.

In one embodiment of the present invention, the (double) compound visual signature is displayed to the human at the receiving mail client on the e-mail in the form as shown at D15 in FIG. 8 where the acceptance identifier and random number are both visible to a human on the visual signature image. In the embodiment of D15, the acceptance identifier on the e-mail apart from the visual signature image is also visible to the human when displayed at the receiving mail client.

However, in another embodiment of the present invention, one or both of the acceptance identifiers (embedded in the visual signature image and embedded in the e-mail apart from the visual signature image) are hidden from the end user or displayed too small to humanly read, i.e. the acceptance identifier is not visibly displayed with the visual signature or e-mail. In this other embodiment where the acceptance identifier is hidden altogether from the human, the acceptance identifier is provided as a "water mark" in the visual signature file that defines the visual signature and acceptance identifier. "Water mark" technology is already known in the "digital content" field where the name of the owner of a digital video or digital audio file is embedded in the file but hidden from the user when the file is played. In the present invention, when the acceptance identifier is intended to be hidden altogether from the end user, the sending mail server incorporates the acceptance identifier in the visual signature file (which defines the visual signature image and acceptance identifier) such that the acceptance identifier is not displayed at all with the visual signature image or e-mail, but the acceptance identifier is digitally readable from the visual signature file to verify who originated and who was (were) an intended recipient of the e-mail. Others who possess the e-mail were not intended as recipients by the originator of the e-mail, and presumably should not have received the e-mail.

In one embodiment of the present invention, the compound visual signature (with or without the visual acceptance identifier) is visible when the e-mail is opened, as described above (and is not an attachment (data) file or an icon for an attachment (data) file). If someone detaches the visual signature from the e-mail, and attaches it to another e-mail, the associated acceptance identifier will reveal that the e-mail is not authentic, i.e. was not sent by the "owner" of the visual signature.

In another embodiment of the present invention, the compound visual signature (with or without the visible acceptance identifier) can be an attachment represented by an icon. (The nature or graphic form of the icon is not important to this embodiment of the present invention.) In such a case, the compound visible signature itself will not be visible immediately when the human opens the e-mail. In this other embodiment, when the human wants to see the visual signature, the human can select/click on the icon to "open/display" the compound visual signature. Nevertheless, if someone detaches the visual signature attachment from the e-mail, and attaches it to another e-mail, the associated acceptance identifier will reveal that the e-mail is not authentic, i.e. was not sent by the "owner" of the visual signature. Also, the acceptance identifier in the visual signature attachment will not likely match the acceptance identifier, if any, on the body of the e-mail.

In another embodiment of the present invention, the compound visual signature (with or without the visible acceptance identifier) serves as an icon for an attachment (data) file (for example, a report, photo, spread sheet, etc.). So, when the end user selects/clicks-on the compound visual signature icon, the attachment (data) file opens to reveal the data within the attachment. In this latter case, if the attachment (data) file is detached, generally the compound visual signature icon will remain as the icon for the attachment (data) file, and the acceptance identifier will remain associated with the icon even if not visible with the icon. The acceptance identifier associated with the icon will still reveal the originator and intended recipient of the attachment (data) file. If a person downstream receives the attachment (data) file, after detachment from the original e-mail and attachment to another e-mail, it will be apparent from the acceptance identifier associated with icon that this downstream person was not intended as a recipient of the attachment (data) file. Also, the acceptance identifier on the icon will not likely match the acceptance identifier, if any, on the body of the e-mail.

The following measures are also provided to improve security. The visual signature managing unit 32 manages the compound visual signature image separately from the e-mail, and supplies it to the e-mail processing unit 31 when display of the e-mail is requested. When the e-mail is deleted, the compound visual signature image managed by the visual signature managing unit 32 is also deleted. When the receiving mail server 30 forwards an e-mail including a request to display a visual signature image, the receiving mail server 30 only sends the body of the e-mail, not the visual signature image or compound visual signature image.

Figure 9:
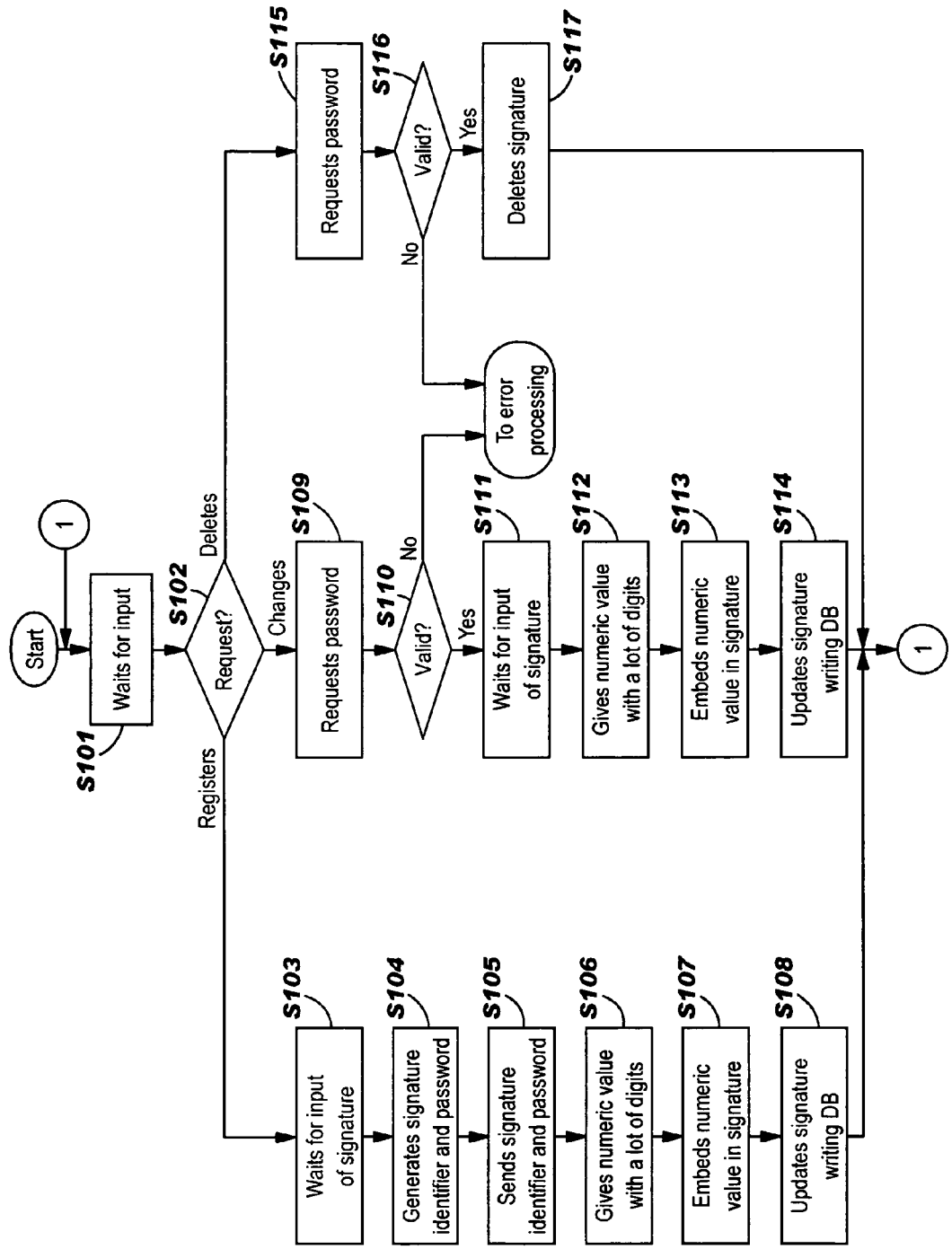
FIG. 9 is a flowchart showing registration, change and deletion operations for a visual signature image according to the present invention.

FIG. 9 illustrates in more detail the process, described above, performed by the visual signature managing unit 12 for registering, changing and deleting a visual signature image upon request by an owner of the visual signature image. Initially, the visual signature managing unit 12 waits for input such as a request to register a visual signature image (step 101). When the input is received, the visual signature managing unit 12 determines the nature of the input (step 102). The following is the process when the input is a request to register a visual signature image. In step 103, the visual signature managing unit 12 waits for input of a visual signature image file. When the visual signature image file is received from the owner/person via a sending mail client, the visual signature managing unit 12 generates a signature identifier and a password (step 104). Then, the visual signature managing unit 12 sends the signature identifier and the password to the sending mail client (step 105). Next, the visual signature managing unit 12 determines a random numeric value with multiple digits (step 106), and superimposes it on the visual signature image to form a "compound" visual signature image (step 107). Next, the visual signature managing unit 12 stores the image file of this compound visual signature in the sending signature storing unit 13. The visual signature managing unit 12 also records the signature identifier, the location of the image file (i.e. a storage address in the sending signature storing unit 13), the password of the person and a log entry in sending signature DB 14. This record indicates that the compound visual signature has been registered with the sending signature DB 14. The log entry indicates a compound visual signature image has been created and the date and time. Then, the visual signature managing unit 12 returns to step 101 to wait for new input while registration of the visual signature is logged in DB 16.

The following is a process performed by the visual signature managing unit 12 when a person makes a request to the sending mail server 10 to change a visual signature image. In response to this request, the visual signature managing unit 12 requests a signature identifier and a password from the person (step 109). When the person supplies the signature identifier and the password, the visual signature managing unit 12 determines if the combination of signature identifier and password supplied by the person is valid, i.e. matches a combination which is stored in sending signature DB 14 (step 110). If not, then error processing proceeds, i.e. to prompt to re-input of password, or to prompt to select from sending the e-mail without signature or cancellation of sending the e-mail. However, if the combination is valid, then the visual signature managing unit 12 waits for input of a new visual signature image (step 111). When the person sends an image file of the new visual signature from the sending mail client, the visual signature managing unit 12 determines a new random numeric value with multiple digits (step 112), and superimposes it on the new visual signature image (step 113). This new "compound" visual signature image then replaces the original one referenced by the record in the sending signature DB 14 (step 114). More specifically, visual signature managing unit 12 acquires from the sending signature DB 14 the record for the signature identifier input from the person. Then, the visual signature managing unit 12 reads from the record the location of the original compound visual signature image file. At this location, the visual signature managing unit 12 writes the new compound visual signature image file. Next, the visual signature managing unit 12 writes a new log entry in the sending signature DB 14 indicating that the compound visual signature has been updated. Then, the processing returns to step 101 to await new input while registration of the visual signature is logged in DB 16.

The following is the process performed in the visual signature managing unit 12 when a person requests to delete a visual signature image. In response to this request, the visual signature managing unit 12 requests a signature identifier and password from the person/signature holder (step 115). When the person supplies the signature identifier and password, the visual signature managing unit 12 determines if the combination is valid, i.e. matches a combination in a record within the sending signature DB 14 (step 116). If the combination does not match, then error processing is performed. However, if the combination matches, then the compound visual signature image file at the location in sending signature storing unit 13 indicated by the record for this signature identifier is deleted along with the record in the sending signature DB 14 for this signature identifier (step 117). The visual signature managing unit 12 also makes a log entry in the log DB 16 indicating that the compound visual signature image file has been deleted. The process then returns to step 101 to await a new request.

Figure 10:
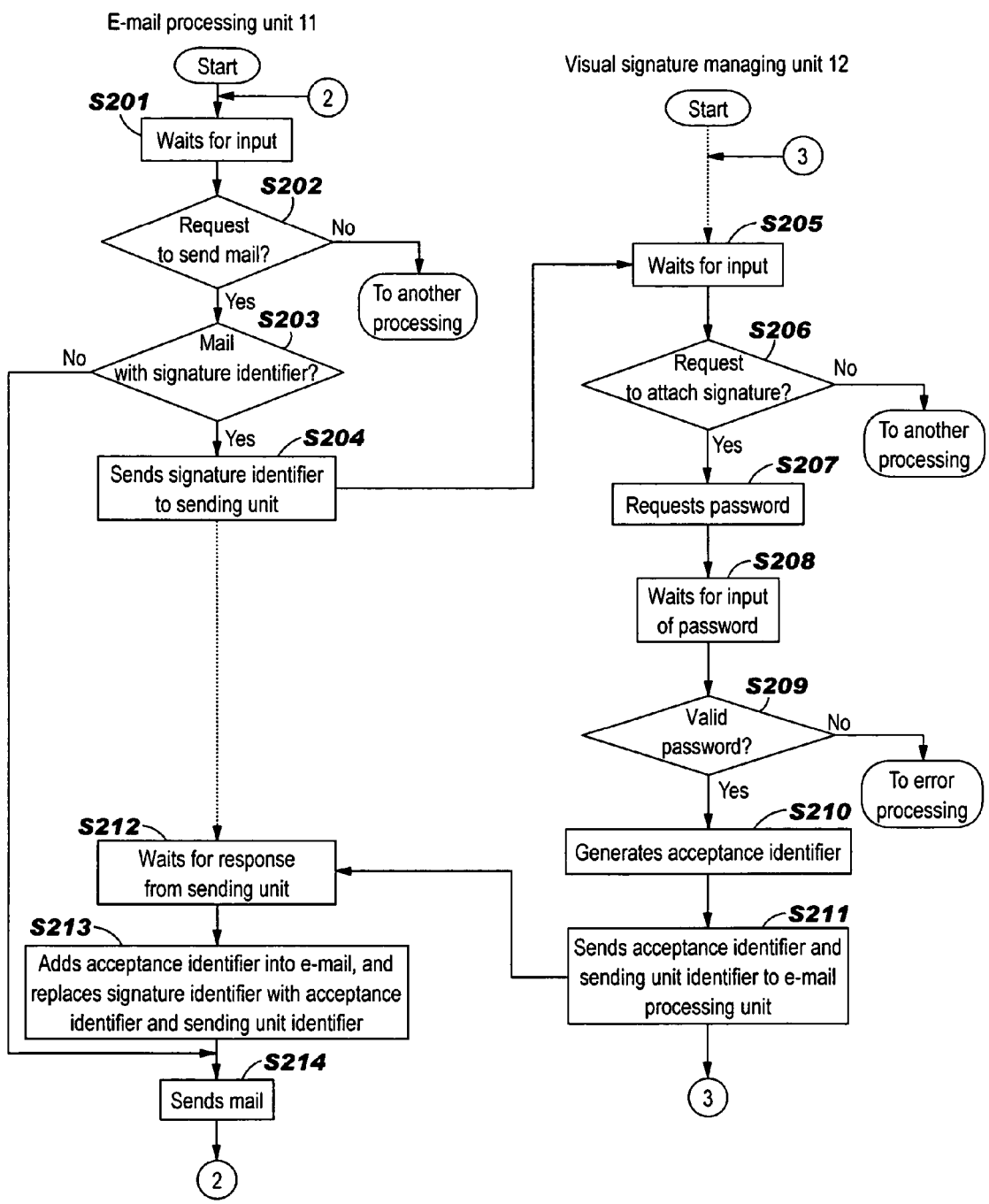
FIG. 10 is a flowchart showing steps of sending an e-mail from a sending mail server to a receiving mail server according to the present invention.

FIG. 10 illustrates in more detail the process, described above, performed by the sending mail server 10 for sending an e-mail (with an acceptance identifier and sending unit identifier) to the receiving mail server 30. (The compound visual signature image will be sent later, as described below with reference to FIG. 11.) Initially, the e-mail processing unit 11 waits for input/request (step 201). When input is made, the e-mail processing unit 11 determines if it is a request to send an e-mail (step 202). If so, the e-mail processing unit 11 determines if the request is to send an e-mail with a visual signature image (step 203). This determination is made by looking for a signature identifier within the e-mail which indicates a request to send an e-mail with a visual signature image. If the request is to send an e-mail, but without a visual signature image, then the e-mail processing unit 11 sends the e-mail to the receiving mail server 30 in the prior art manner, i.e. it is routed to the e-mail processing unit 31 of the receiving mail server 30. However, if the request is to send an e-mail with a visual signature image, then the e-mail processing unit 11 extracts the signature identifier and sender/receiver information from the e-mail and sends the signature identifier and sender/receiver information to the visual signature managing unit 12 (step 204). The e-mail processing unit 11 can also send the expiration date and time provided by the sender of the e-mail for the visual signature image to the visual signature managing unit 12.

The visual signature managing unit 12 is waiting for such input (step 205), and when received, determines whether the input is a request is to attach a visual signature image to the e-mail (step 206). In the present case, this is so because the request includes a signature identifier. So the visual signature managing unit 12 then requests a password from the person at the sending mail client (step 207), and then waits for a response (step 208). Also, the visual signature managing unit 12 makes an entry in log DB 16 to indicate that inclusion of a visual signature image in an e-mail has been requested (as an image on the e-mail, an icon for an attachment (data) file or as an image within an attachment (data) file). When the person/sending mail client furnishes the password, the visual signature managing unit 12 determines whether the combination of the password and the signature identifier match a combination in the sending signature DB 14 (step 209). If not, error processing is performed. However, if the combination matches, i.e. is valid, the visual signature managing unit 12 generates an acceptance identifier for this e-mail, and registers the acceptance identifier with the acceptance identifier DB 15 (step 210). The acceptance identifier is generated by combining the sender/receiver information acquired at step 205 with an acceptance date and time information acquired by an internal calendar and clock device (neither shown). Optionally, the visual signature managing unit 12 can also generate an arbitrary number to uniquely identify the request, and store the sender/receiver information acquired at step 205 and the acceptance date and time information in association with the arbitrary number, for example. A single e-mail may be sent to multiple destinations at the same time, at the request of the sending mail client. In such a case, a different acceptance identifier (based on different receiver information) is generated for each destination. The acceptance identifier generated in step 210, the signature identifier received in step 205, the date and time information optionally recorded in step 205, and a destination identifier included in the sender/receiver information received at step 205 are registered in the acceptance identifier DB 15. The visual signature managing unit 12 then transfers the acceptance identifier and the sending unit identifier to the e-mail processing unit 11 (step 211). Also, the visual signature managing unit 12 makes an entry in log DB 16 that an acceptance identifier is to be embedded in the e-mail and was sent to the e-mail processing unit 11.

The e-mail processing unit 11 is waiting for a response from the visual signature managing unit 12 (step 212). When the acceptance identifier and the sending unit identifier are received, the e-mail processing unit 11 adds the acceptance identifier to the message of the e-mail, and replaces the signature identifier with the acceptance identifier and sending unit identifier (step 213). Then, the e-mail processing unit 11 sends the e-mail with the acceptance identifier and the sending unit identifier (without the signature identifier) to the receiving mail server 30 (step 214). The e-mail processing unit 12 then returns to step 201 to wait for new input.

Figure 11:
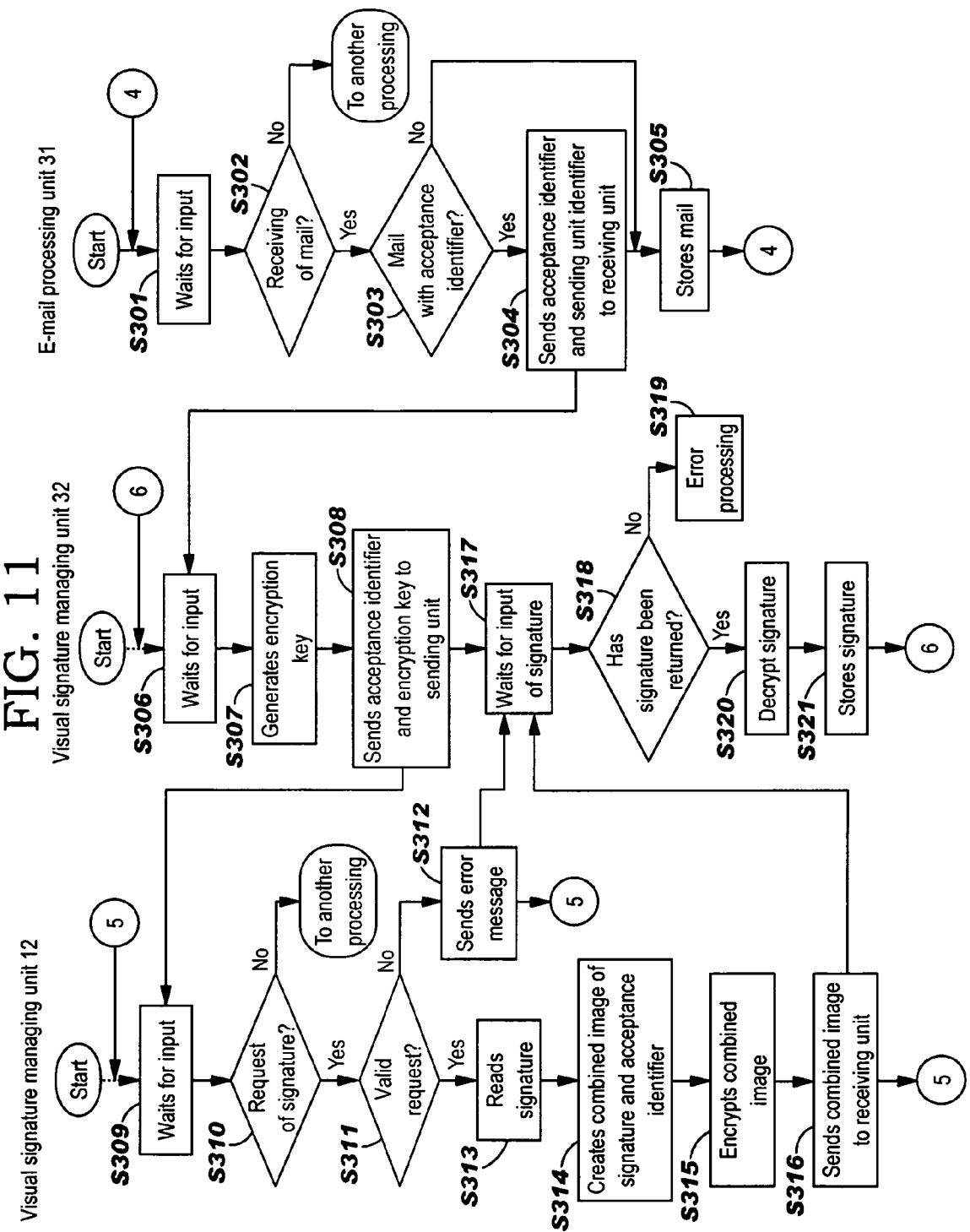
FIG. 11 is a flowchart showing steps of receiving an e-mail and acquiring a visual signature image according to the present invention.

FIG. 11 illustrates in more detail processing after the receiving mail server 30 receives the e-mail with the acceptance identifier and sending unit identifier, and then acquires the compound visual signature image from the sending mail server 10. Initially, the e-mail processing unit 31 is waiting for input (step 301). When input is received, the e-mail processing unit 31 determines whether it is an e-mail (step 302). If the input is not an e-mail, another processing is performed. However, if the input is an e-mail, then the e-mail processing unit 31 determines whether the received e-mail includes an acceptance identifier and a sending unit identifier (step 303). The acceptance identifier and sending unit identifier may comprise specific symbols recognizable by the e-mail processing unit 31 as an acceptance identifier and a sending unit identifier. Alternately, the sending mail server 10 could have added information to the e-mail header to indicate the presence of an acceptance identifier and a sending unit identifier in the e-mail. If the e-mail is not an e-mail with an acceptance identifier and a sending unit identifier, then the received e-mail is stored and processed as an ordinary e-mail (step 305). However, if the e-mail includes an acceptance identifier and a sending unit identifier, then the e-mail processing unit 31 extracts the acceptance identifier and the sending unit identifier from the e-mail and forwards them to the visual signature managing unit 32 (step 304). The e-mail processing unit 31 also stores the e-mail (step 305). The visual signature managing unit 32 is waiting for input (step 306). When the acceptance identifier and the sending unit identifier are received from the e-mail processing unit 31, the visual signature managing unit 32 writes a record in log DB 35 that an e-mail with an acceptance identifier has been received, and identifies or generates an encryption key (step 307). The receiving mail server 30 stores the encryption key and a decryption key, or information used by the visual signature managing unit 32 to generate an encryption key and a decryption key. The visual signature managing unit 32 in the receiving mail server sends the acceptance identifier and the encryption key to the visual signature managing unit 12 in the sending mail server (step 308). Also, the visual signature managing unit 32 writes a record in log DB 35 that sending of a compound visual signature image has been requested.

The visual signature managing unit 12 is waiting for input (step 309). When input is made, the visual signature managing unit 12 determines whether the input is a request to send an e-mail with a visual signature image (step 310). If not, another processing is performed. However, if the request is to send an e-mail with a visual signature image, then the visual signature managing unit 12 determines whether the request is valid (step 311). To make this determination, the visual signature managing unit 12 attempts to acquire from the acceptance identifier DB 15 a record of the acceptance identifier which has been sent by the visual signature managing unit 32. The request can only be considered valid when the record can be acquired. It is also possible to determine, when expiration date and time information has been sent, whether the current date and time is after the expiration date and time included in the record. The request can only be valid if the current time and date is before the expiration date and time, even if the record has been acquired. The record may be deleted when the current date and time is after the expiration date and time. If the request to send the e-mail with the visual signature image is not valid (step 311, no branch), then an error message is sent to the visual signature managing unit 32 (step 312). However, if the request is valid, then the visual signature managing unit 12 locates from the record the image file containing the visual signature. Then, the visual signature managing unit 12 reads the compound visual signature image from this location (step 313). Then, the compound visual signature image and the acceptance identifier are combined into a "double" compound image in which they are difficult to separate (step 314). This "double" compound image also includes the numeric value generated earlier. Then, the compound visual signature image is encrypted with the encryption key received at step 309 (step 315) and sent to the visual signature managing unit 32 (step 316). Also, the visual signature managing unit 12 writes a record in log DB 16 that a compound visual signature image has been sent to the receiving mail server. The visual signature managing unit 12 then deletes the record in the acceptance identifier DB 15 corresponding to the acceptance identifier included in the compound visual signature image, and the process returns to step 309 to wait for input. (Preferably, each record stored in the acceptance identifier DB 15 is deleted when a corresponding visual signature image is sent. However, to permit batch processing, a "sent" flag, which indicates whether a visual signature image has been sent, may be provided. With the sent flag, each record can be deleted at a later time such as during batch processing once a day, for example, or when a sufficient number of days have elapsed since a record was created. In the latter case, each record includes a field which indicates the date of its creation.)

The visual signature managing unit 32 is waiting for input of a (double) compound visual signature image (step 317). When data is externally inputted, the visual signature managing unit 32 determines whether it is a compound visual signature image (step 318). If not, then error processing is performed (step 319), and the process returns to step 306 to wait for new input. However, if the input is a compound visual signature image, then the visual signature managing unit 32 writes a record in log DB 35 that the compound visual signature has been received, and decrypts the compound visual signature image (step 320). The visual signature may be decrypted by a decryption key stored in the receiving mail server 30, or by a decryption key generated by a program stored in the receiving mail server 30. The visual signature managing unit 32 then stores the decrypted compound visual signature image file in the receiving signature storing unit 33.

The visual signature managing unit 32 also registers the acceptance identifier, the e-mail receiving date and time, the signature sending request date and time, the signature receiving date and time, and the location information for the compound visual signature image file (i.e. an address in the receiving signature storing unit 33) in the receiving signature DB 34 (step 321). The process then returns to step 306 to wait for new input. If desired, the registration of the information with the receiving signature DB 34 may be performed earlier. That is, the acceptance identifier and the mail receiving date and time may be registered with the receiving signature DB 34 when notification has been received that an e-mail with an acceptance identifier has been received at step 306. The request date and time may be registered when sending of a visual signature image is requested at step 308. Only the visual signature image receiving date and time and the location information of the image file may be registered at step 321.

Figure 12:
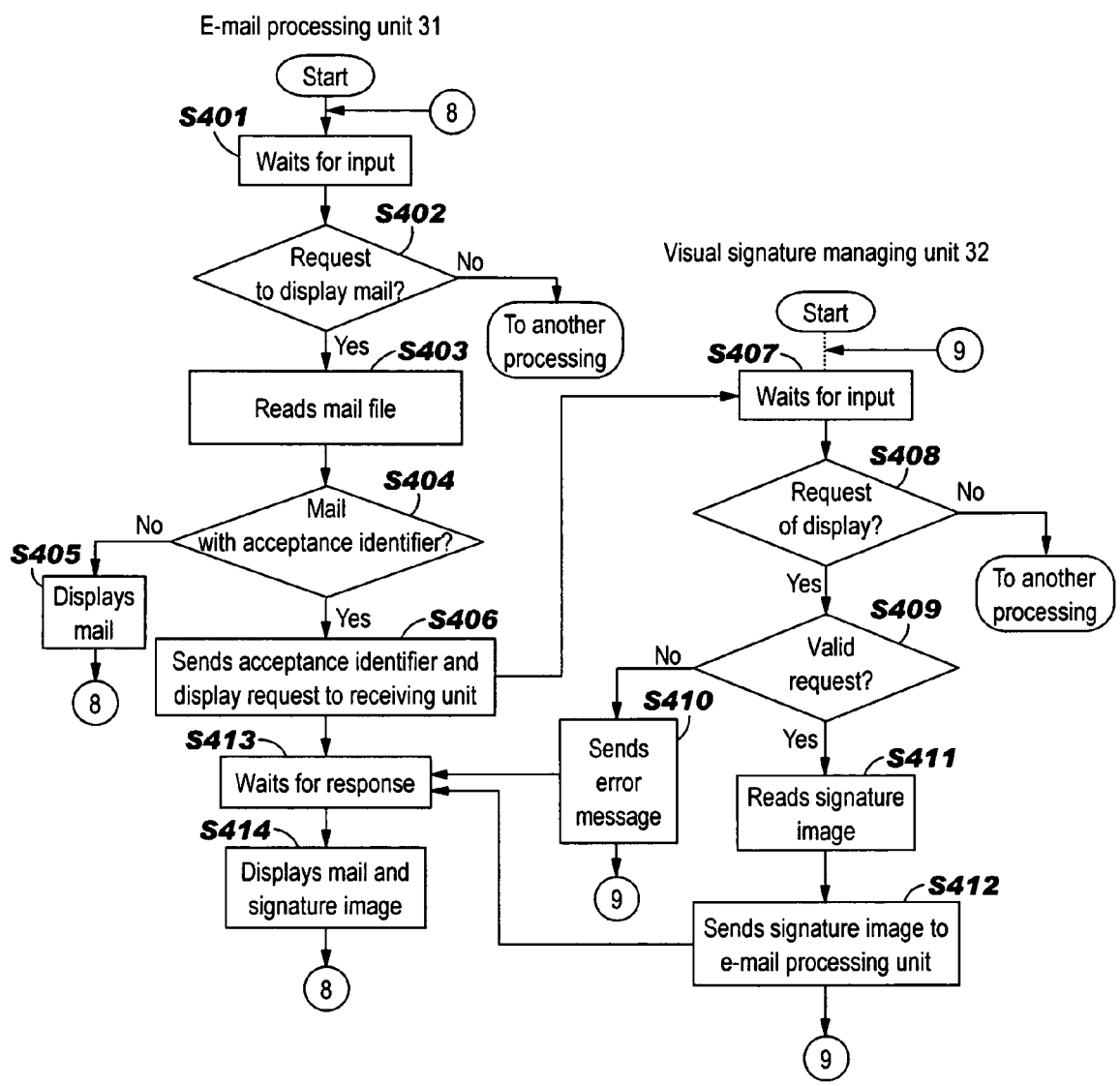
FIG. 12 is a flowchart showing steps of sending an e-mail with a visual signature image to an intended recipient according to the present invention.

FIG. 12 illustrates in more detail a subsequent process for sending the e-mail with the compound visual signature image to a receiving mail client of an intended recipient when the intended recipient requests to view the e-mail. Initially, the e-mail processing unit 31 is waiting for input (step 401). When input is received, the e-mail processing unit 31 determines whether it is a request to display the e-mail at the receiving mail client, i.e. send the e-mail with the compound visual signature image to the receiving mail client of the intended recipient (step 402). If not, another processing is performed. However, if the input is a request to display/send the e-mail to the receiving mail client, then e-mail processing unit 31 reads the e-mail (step 403) to determine whether the e-mail includes an acceptance identifier and a sending unit identifier (optionally identified by predetermined symbols) (step 404). This determination can be made by searching for predetermined symbols used for the acceptance identifier and sending unit identifier, or information in the header of the e-mail that indicates the e-mail includes an acceptance identifier and sending unit identifier. If the e-mail does not include an acceptance identifier, then the e-mail is sent to the intended recipient and displayed on the receiving mail client as an ordinary e-mail (step 405), and the processing returns to step 401 to wait for new input. However, if the e-mail includes an acceptance identifier, then the acceptance identifier and the display/send request are sent to the visual signature managing unit 32 (step 406). The visual signature managing unit 32 is waiting for input (step 407). When input is made, the visual signature managing unit 32 determines whether the input is a request to display an e-mail (step 408). If not, another processing is performed. However, if the input is a request to display an e-mail, then the visual signature managing unit 32 determines whether the send/display request is valid (step 409). This determination is made as follows. The acceptance identifier is extracted from the compound visual signature image stored in the receiving signature storing unit 33. Receiver information included in the acceptance identifier (for example, the e-mail address of a valid receiver of the e-mail as stated in the header of the e-mail) and information about the person who currently requests display (for example, the e-mail address of the person who currently requests display) are compared. If they correspond to each other, the display request is valid. In addition, it may be required as a condition for validity that the acceptance identifier embedded in the body of the e-mail read from storage and the acceptance identifier extracted from the combined visual signature image stored in the receiving signature storing unit 33 correspond to each other. If the display request is not valid, then an error message is sent to the e-mail processing unit 31 (step 410). If the display request is valid, then an image file including a compound visual signature is read (step 411). The image file including the compound visual signature is then sent to the e-mail processing unit 31 (step 412). Also, the visual signature managing unit 32 writes a record to log DB 35 that the image file including the visual signature has been sent to the e-mail processing unit 31.

The e-mail processing unit 31 is waiting for a response (step 413). When the image file including a compound visual signature image is sent from the visual signature managing unit 32, the e-mail processing unit 32 adds the compound visual signature image to the e-mail for transmission to the receiving mail client and display at the receiving mail client (step 414). Then, the process returns to step 401 to wait new input. When an error message is sent from the visual signature managing unit 32 at step 413, e-mail processing unit 31 notifies the receiving mail client that display of the visual signature image is not permitted.

Figure 13:
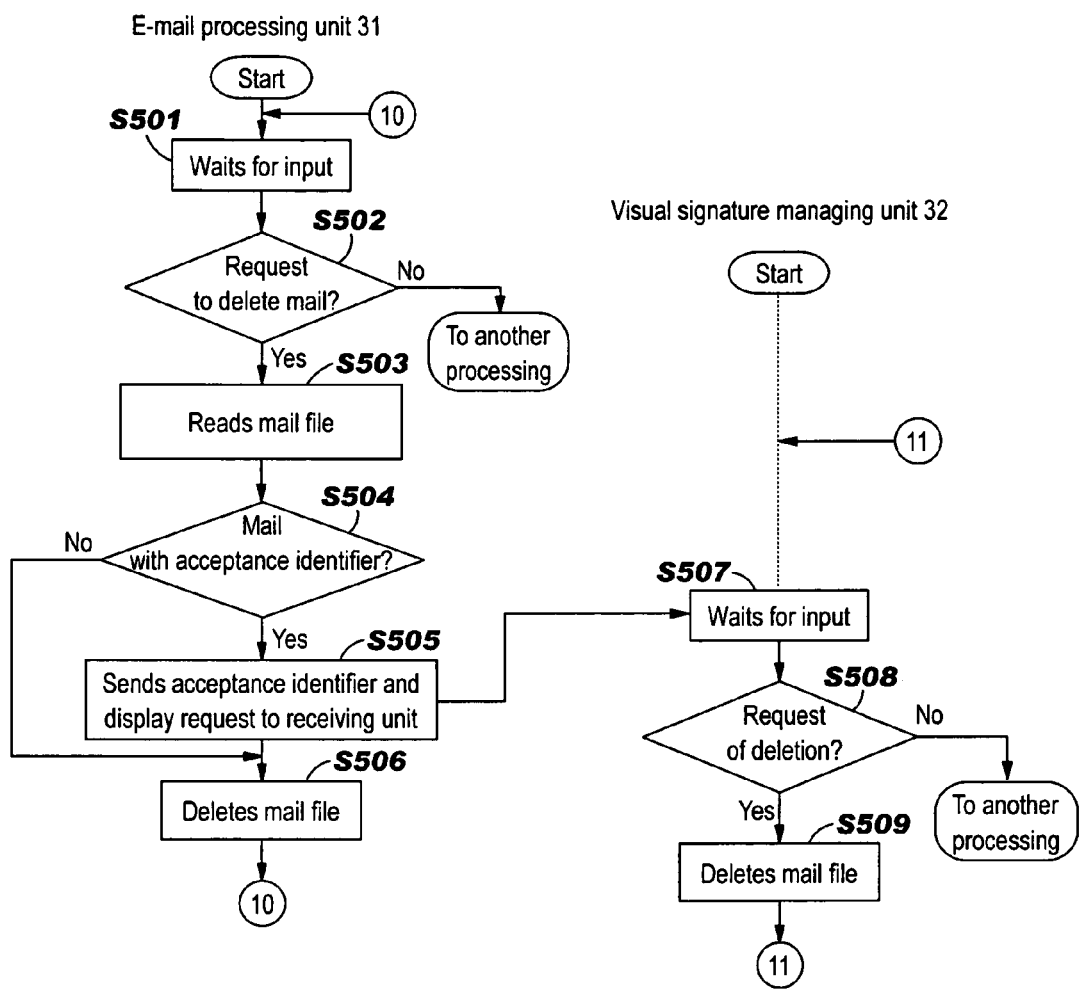
FIG. 13 is a flowchart showing steps of deleting an e-mail and associated visual signature image according to the present invention.

FIG. 13 illustrates in more detail a process for deleting an e-mail? and associated compound visual signature image from the receiving mail server 30 after they are sent to the intended receiving mail client. Initially, the e-mail processing unit 31 is waiting for input (step 501). When an input is made, the e-mail processing unit 31 determines whether it is a request to delete an e-mail (step 502). If not, another processing is performed. However, if the input is a request to delete an e-mail, then the e-mail processing unit reads the requested e-mail (step 503) to determine if the e-mail includes an acceptance identifier (step 504). This determination can be based on predetermined symbols used for the acceptance identifier and a sending unit identifier or information added by the sending mail server 10 to the e-mail to indicate that the e-mail includes an acceptance identifier and a sending unit identifier. If the e-mail does not include an acceptance identifier, then the e-mail is deleted (step 506) and the process returns to step 501 to wait for new input. However, if the e-mail includes an acceptance identifier, then the e-mail processing unit 31 sends the acceptance identifier and the deletion request to the visual signature managing unit 32 (step 505) to delete the e-mail (step 506). The visual signature managing unit 32 is waiting for input (step 507). When input is made, the visual signature managing unit 32 determines whether the input is a request to delete an e-mail (step 508). If not, then other processing is performed. However, if the input is a request to delete an e-mail, then the visual signature managing unit 32 determines whether the request is valid. This determination is based on the same conditions as those of step 409 in FIG. 12 when deleting the visual signature at step 509. If the request is valid, the visual signature managing unit 32 deletes the e-mail and the associated image file including the visual signature (step 509). Then, the process returns to step 507 to wait for new input. Also, the visual signature managing unit 32 writes a record into log DB 35 indicating that the image file including the visual signature has been deleted.

As described above, a compound visual signature image is generated by combining a visual signature image with an acceptance identifier into one image. In the illustrated embodiment, the acceptance identifier includes information on sending/receiving of the visual signature image. The acceptance identifier is difficult to separate from the visual signature image in the compound visual signature image. This enables the original sender and receiver of the visual signature to be traced later. In the receiving mail server 30 which has received the compound visual signature image, the visual signature managing unit 32 permits display of the compound visual signature image only when receiver information in the acceptance identifier included in the compound visual signature image and information about the person who requests display of the visual signature correspond to each other. This limits who can see the compound visual signature image. Only an intended recipient person, who has received an e-mail with a visual signature attached thereto from the person who created the signature, can see the visual signature. Furthermore, the visual signature managing unit 12, which has received a request to attach a visual signature image to an e-mail, generates an acceptance identifier for uniquely identifying the visual signature inclusion request. The visual signature managing unit 12 manages the request in association with a signature identifier for uniquely identifying a visual signature, and sends the acceptance identifier to the receiving mail server by embedding it in the e-mail. An e-mail and a compound visual signature image are separately managed.

Moreover, a visual signature image is registered in advance. A signature identifier and a password are requested from a sender (person) when the person requests inclusion of a visual signature image in an e-mail so that only the person who registered the signature can add his or her visual signature image to an e-mail to be sent. Furthermore, by embedding in the visual signature image a random numeric value generated during the original registration, if an imposter later attempts to register the same visual signature image, it will be assigned and embedded with a different random numeric value. (Optionally, the random numeric value can be based in part on the password of the registrant.) Furthermore, an encrypted compound visual signature based on an encryption key received from the receiving mail server 30, is sent by the sending mail server 10 so that the visual signature image is not disclosed even if it is unauthorizedly viewed during transmission, without help of a third agency for validity assurance. Not only the e-mail, but any attachments to the e-mail are authenticated by the compound visual signature image.

Based on the foregoing, a system, method and program product for attaching a compound visual signature image to an e-mail have been illustrated. However, numerous modifications and substitutions can be made without deviating from the scope of the present invention. Therefore the invention has been disclosed by way of illustration and not limitation, and reference should be made to the following claims to determine the scope of the present invention.

The invention claimed is:

1. A method for authenticating an e-mail, the method comprising the steps of:
   a first mail server receiving a request from a user requesting to register a visual signature image with the first mail server, and in response, the first mail server furnishing a first identifier to the user;
   subsequently, the first mail server receiving (i) a request from the user requesting the first mail server to send an e-mail with the visual signature image and (ii) the e-mail and first identifier from the user, and in response, the first mail server validating the first identifier, and sending the e-mail with a second identifier to a second mail server, wherein the second identifier identifies an addressee of the e-mail;
   the first mail server receiving from the second mail server a request to send the visual signature image embedded with the second identifier; and
   the first mail server embedding the second identifier in the visual signature image and sending the visual signature image with the embedded second identifier to the second mail server.

2. The method of claim 1 further comprising the steps of:
   the first mail server embedding a third identifier in the visual signature image in response to the step of the user requesting to register the visual signature image; and wherein
   the step of the first mail server embedding the second identifier in the visual signature image comprises the step of the first mail server embedding the second identifier in the visual signature image embedded with the third identifier.

3. The method of claim 1 further comprising the steps of:
   the second mail server validating the second identifier; wherein after the step of the second mail server validating the second identifier, and before the step of the first mail server sending the visual signature image with the embedded second identifier to the second mail server, the second mail server requesting the first mail server to send the visual signature embedded with the second identifier.

4. The method of claim 1 further comprising validating the second identifier by the second mail server; wherein after the step of the second mail server validating the second identifier and before the step of the first mail server embedding the second identifier in the visual signature image, the second mail server sending the second identifier and an encryption key for the visual signature image embedded with the second identifier to the first mail server.

5. The method of claim 1 wherein the first mail server sends the e-mail with the second identifier to the second mail server, the first mail server includes an identifier of the first mail server.

6. The method of claim 1 further comprising validating the second identifier by the second mail server; wherein after the second mail server validates the second identifier, the second mail server sends the second identifier and an encryption key to the first mail server; and when the first mail server sends the visual signature image with the embedded second identifier to the second mail server, the visual signature image with the embedded second identifier is encrypted with the encryption key.

7. The method of claim 1 further comprising the steps of:
   the first mail server embedding a third identifier in the visual signature image in response to the step of the user requesting to register the visual signature image;
   validating the second identifier by the second mail server; and wherein
   after the second mail server validates the second identifier, the second mail server sends the second identifier and an encryption key to the first mail server; and when the first mail server sends the visual signature image with the embedded second identifier to the second mail server, the visual signature image is embedded with both the second and third identifiers and is encrypted with the encryption key.

8. The method of claim 1 further comprising the steps of:
   an intended recipient of the e-mail requesting the e-mail from the second mail server, and in response, the second mail server furnishing the e-mail with the visual signature image with the second identifier embedded therein.

9. The method of claim 1 further comprising validating the second identifier by the second mail server; wherein the second identifier identifies an addressee of the e-mail, and wherein the step of the second mail server validating the second identifier comprises the step of the second mail server comparing the addressee identified by the second identifier to an addressee within the e-mail.

10. The method of claim 1 wherein the step of the first mail server embedding the second identifier in the visual signature image comprises the step of the first server incorporating the second identifier in a digital file which defines the visual signature image such that the second identifier is not displayed with the visual signature image, but is digitally readable from the digital file.

11. The method of claim 1 wherein the step of the first mail server embedding the second identifier in the visual signature image comprises the step of the first mail server incorporating the second identifier in a digital file which defines the visual signature image such that the second identifier is displayed with the visual signature image.

12. A computer program product for authenticating an e-mail, the computer program product comprising:
a computer-readable tangible storage device;
first program instructions for execution with a first mail server and responsive to a user request to register a visual signature image with the first mail server, to furnish a first identifier to the user;
second program instructions for execution within the first mailer server and responsive to a user request to send an e-mail with the visual signature image, the request including the first identifier, to validate the first identifier, and if valid, send the e-mail with a second identifier to a second mail server, wherein the second identifier identifies an addressee of the e-mail;
third program instructions for execution within the second mail server to validate the second identifier;
fourth program instructions for execution within the first mail server to receive from the second mail server a request to send the visual signature image embedded with the second identifier; and
fifth program instructions for execution within the first mail server to embed the second identifier in the visual signature image and send the visual signature image with the embedded second identifier to the second mail server; and wherein
the first, second, third, fourth and fifth program instructions are recorded on the computer-readable tangible storage device.

13. The computer program product of claim 12 further comprising:
sixth program instructions for execution in the first mail server to embed a third identifier in the visual signature image in response to the user request to register the visual signature image; and wherein
the fifth program instructions embed the second identifier in the visual signature image embedded with the third identifier; and wherein
the sixth program instructions are recorded on the computer-readable tangible storage device.

14. The computer program product of claim 12 wherein the second program instructions validate the first identifier based on a password of the user.

15. The computer program product of claim 12 wherein the second identifier includes an identity of an intended recipient of the e-mail.

16. The computer program product of claim 12 wherein the second program instructions send the e-mail with the second identifier to the second mail server, the second program instructions include an identifier of the first mail server.

17. The computer program product of claim 12 wherein after the third program instructions validate the second identifier, the third program instructions send the second identifier and an encryption key to the first mail server; and when the fifth program instructions send the visual signature image with the embedded second identifier to the second mail server, the visual signature image with the embedded second identifier is encrypted with the encryption key.

18. The computer program product of claim 12 further comprising:
sixth program instructions for execution within the first mail server to embed a third identifier in the visual signature image in response to the step of the user requesting to register the visual signature image; and wherein
after the second program instructions validate the second identifier, the second program instructions send the second identifier and an encryption key to the first mail server; and when the fifth program instructions send the visual signature image with the embedded second identifier to the second mail server, the visual signature image is embedded with both the second and third identifiers and is encrypted with the encryption key; and wherein the sixth program instructions are recorded on the computer-readable tangible storage device.

19. The computer program product of claim 12 further comprising:
sixth program instructions for execution within the second mail server and responsive to a request from an addressee of the e-mail to receive the e-mail, to furnish the e-mail with the visual signature image with the second identifier embedded therein; and wherein
the sixth program instructions are recorded on the computer-readable tangible storage device.

20. The computer program product of claim 12 wherein the second identifier identifies an addressee of the e-mail, and wherein the second program instructions validate the second identifier by comparing the addressee identified by the second identifier to an addressee within the e-mail.

21. The computer program product of claim 12 wherein the fifth program instructions embed the second identifier in the visual signature image by incorporating the second identifier in a digital file which defines the visual signature image such that the second identifier is not displayed with the visual signature image, but is digitally readable from the digital file.

22. The computer program product of claim 12 wherein the fifth program instructions embed the second identifier in the visual signature image by incorporating the second identifier in a digital file which defines the visual signature image such that the second identifier is displayed with the visual signature image.

23. A computer system for authenticating an e-mail, the computer system comprising:
a CPU, a computer readable memory and a computer-readable tangible storage device;
first instructions, responsive to a user request to register a visual signature image with a first mail server, to furnish a first identifier to the user;
second instructions, responsive to a user request to send an e-mail with the visual signature image, the request including the first identifier, to validate the first identifier and send the e-mail with a second identifier to a second mail server, wherein the second identifier identifies an addressee of the e-mail;
third instructions to validate the second identifier;
fourth instructions to receive from the second mail server a request to send the visual signature image embedded with the second identifier; and
fifth instructions to embed the second identifier in the visual signature image and send the visual signature image with the embedded second identifier to the second mail server; and wherein the first, second, third, fourth and fifth instructions are stored on the computer-readable tangible storage device for execution by the CPU via the computer readable memory.

24. The system of claim 23 wherein the second identifier identifies an addressee of the e-mail, and wherein the second instructions validates the second identifier by comparing the addressee identified by the second identifier to an addressee within the e-mail.

25. A computer system for authenticating an e-mail, the computer system comprising:
a first mail server that receives a request from a user requesting to register a visual signature image with the first mail server, and in response, the first mail server embeds a first identifier in the visual signature image and furnishes a signature identifier to the user;
the first mail server subsequently receives a send request from the user requesting the first mail server to send an e-mail with the visual signature image and receives the e-mail and signature identifier from the user, and in response, the first mail server validates the signature identifier, and sends the e-mail with an acceptance identifier and a first mail server identifier to a second mail server, and in response, the second mail server validates the acceptance identifier and sends the acceptance identifier to the first mail server, and in response, the first mail server embeds the acceptance identifier in the visual signature image with the embedded first identifier and sends the visual signature image with the embedded acceptance identifier and first identifier, to the second mail server.

26. The computer system of claim 25 further comprising:
the second mail server receives an e-mail request from an intended recipient of the e-mail, and in response, the second mail server furnishes the e-mail with the visual signature image with the acceptance identifier and first identifier embedded therein to the intended recipient.

27. The computer system of claim 25 wherein the acceptance identifier identifies an addressee and a sender of the e-mail.

28. The computer system of claim 25 wherein the acceptance identifier identifies the intended recipient of the e-mail, and wherein the second mail server validates the acceptance identifier by comparing the intended recipient identified by the acceptance identifier to an addressee of the e-mail.

29. The computer system of claim 25 wherein the second mail server sends an encryption key to the first mail server when sending the acceptance identifier to the first mail server; and
the first mail server encrypts, with the encryption key, the visual signature image embedded with the acceptance identifier and first identifier, such that the first mail server sends the visual signature image with the embedded acceptance identifier and first identifier by sending the encrypted visual signature image embedded with the acceptance identifier and first identifier.

30. The computer system of claim 25 wherein the first mail server validates the signature identifier by checking a user password supplied by the user with the signature identifier.

31. The computer system of claim 25 wherein the acceptance identifier identifies an addressee of the e-mail.

* * * * *